United States Patent
Morikawa et al.

(10) Patent No.: US 6,703,165 B2
(45) Date of Patent: Mar. 9, 2004

(54) NICKEL ELECTRODE FOR ALKALINE STORAGE BATTERY, METHOD OF FABRICATING THE SAME, AND ALKALINE STORAGE BATTERY

(75) Inventors: Yuki Morikawa, Tokushima (JP);
Takeshi Ogasawara, Hirakata (JP);
Mitsunori Tokuda, Osaka (JP);
Mutsumi Yano, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 210 days.

(21) Appl. No.: 09/949,785

(22) Filed: Sep. 12, 2001

(65) Prior Publication Data

US 2002/0055043 A1 May 9, 2002

(30) Foreign Application Priority Data

Sep. 12, 2000 (JP) ........................................ 2000-275793

(51) Int. Cl.⁷ ................................................ H01M 4/52
(52) U.S. Cl. ........................................................ 429/223
(58) Field of Search ................................ 429/218.1, 223

(56) References Cited

U.S. PATENT DOCUMENTS 5,968,684 A * 10/1999 Hayashi ...................... 429/223
6,342,318 B1 * 1/2002 hirota ....................... 429/218.2

FOREIGN PATENT DOCUMENTS

| EP | 0 923 146 A1 | 6/1999 | |
|---|---|---|---|
| JP | 08-222213 | 8/1996 | |
| JP | 10-040948 | 2/1998 | |
| JP | 10-125318 | 5/1998 | |
| JP | 11-176436 | 7/1999 | |
| JP | 2000-164217 | * 6/2000 | ............ H01M/4/58 |

* cited by examiner

*Primary Examiner*—Mark Ruthkosky
(74) *Attorney, Agent, or Firm*—Westerman, Hattori, Daniels & Adrian, LLP

(57) ABSTRACT

A nickel electrode for an alkaline storage battery employed as a positive electrode of an alkaline storage battery is formed by filling an active material into pore of a porous sintered substrate wherein said active material is formed by adhering niobic acid to a surface of nickel hydroxide particles.

8 Claims, 1 Drawing Sheet

NICKEL ELECTRODE FOR ALKALINE STORAGE BATTERY, METHOD OF FABRICATING THE SAME, AND ALKALINE STORAGE BATTERY

BACKGROUND OF THE INVENTION

1. Field of the Invention

The present invention relates generally to an alkaline storage battery including a nickel-metal hydride battery, a nickel-cadmium battery, or a nickel-zinc battery, a nickel electrode for an alkaline storage battery employed as a positive electrode of such alkaline storage battery, and a method of fabricating the same, and is particularly characterized in that the nickel electrode for an alkaline storage battery formed by filling a nickel hydroxide-based active material into pore of a porous sintered substrate is modified so that the alkaline storage battery employing as its positive electrode the nickel electrode for an alkaline storage battery performs a high discharge capacity even in a case in which the alkaline storage battery is charged under high temperature conditions.

2. Description of the Related Art

An alkaline storage battery including a nickel-metal hydride battery or a nickel-cadmium battery has conventionally employed as its positive electrode a nickel electrode for an alkaline storage battery in which nickel hydroxide is used as an active material.

Conventionally, as the nickel electrode for an alkaline storage battery, a sintered nickel electrode formed by chemically impregnating a porous sintered substrate which is obtained by filling nickel powder into a porous steel sheet and the like as a substrate and sintering said substrate with nickel salt including nickel nitrate, treating the sintered substrate with an alkaline aqueous solution, and filling the nickel hydroxide as the active material into pore of the porous sintered substrate has been used.

The sintered nickel electrode is superior in collecting current and charge and discharge performance at high electric current because collectivity of the sintered substrate is high and close adherence between nickel hydroxide powder as the active material and the sintered substrate is high.

However, there have remained problems that when the alkaline storage battery employing as its positive electrode the above-mentioned ordinary sintered nickel electrode is charged under high temperature conditions, an oxygen overvoltage of the positive electrode is decreased, thus in addition to a charge reactivity in which the nickel hydroxide is oxidized to nickel oxyhydroxide, a side reaction in which an oxygen evolution reaction occurs and hence a sufficient discharge capacity is not attained occurs.

SUMMARY OF THE INVENTION

An object of the present invention is to modify a nickel electrode for an alkaline storage battery formed by filling a nickel hydroxide-based active material into pore of a porous sintered substrate.

Another object of the present invention is to prevent an oxygen evolution overvoltage in a positive electrode from decreasing and to attain a sufficient discharge capacity even in a case in which an alkaline storage battery employing as its positive electrode the above-mentioned nickel electrode for an alkaline storage battery is charged under high temperature conditions.

The nickel electrode for an alkaline storage battery according to the present invention is formed by filling the active material into the pore of the porous sintered substrate, and the active material is obtained by adhering niobic acid to a surface of nickel hydroxide particles. The above-mentioned niobic acid is a hydrate of niobium oxide represented by a compositional formula $Nb_2O_5 \cdot nH_2O$.

The alkaline storage battery according to the present invention employs as its positive electrode the above-mentioned nickel electrode for an alkaline storage battery formed by filling the active material which is obtained by adhering the niobic acid to the surface of the nickel hydroxide particles into the pore of the porous sintered substrate.

As the above-mentioned nickel electrode for an alkaline storage battery, when the active material obtained by adhering the niobic acid to the surface of nickel hydroxide particles is used, the oxygen overvoltage of the positive electrode is increased for the effect of the above-mentioned niobic acid. Thus, when the alkaline storage battery employing as its positive electrode the nickel electrode for an alkaline storage battery is charged under high temperature conditions, an oxygen evolution reaction in the positive electrode which is a side reaction is prevented from occurring and hence the high discharge capacity is attained.

In adhering the niobic acid to the surface of the nickel hydroxide particles, when an amount of the niobic acid based on the nickel hydroxide is too small, the oxygen overvoltage of the positive electrode is not increased sufficiently, thus the oxygen evolution reaction occurs during charge under high temperature conditions and hence the high discharge capacity is not attained. On the other hand, when the amount of the niobic acid based on the nickel hydroxide is too large, so much amount of the niobic acid is interposed between the above-mentioned sintered substrate and the nickel hydroxide that collecting current in the positive electrode is decreased, thus utilization efficiency of the active material is decreased, thereby decreasing the discharge capacity. Therefore, in adhering the niobic acid to the surface of the nickel hydroxide particles, a weight ratio of niobium in the niobic acid based on the nickel hydroxide is preferably set in a range of 0.05 to 3 wt %.

The nickel electrode for an alkaline storage battery formed by filling the active material which is obtained by adhering the niobic acid to the surface of the nickel hydroxide particles into the pore of the porous sintered substrate is fabricated, for example, by filling the nickel hydroxide into the pore of the porous sintered substrate as in the ordinary manner, then immersing the sintered substrate thus having the nickel hydroxide filled into an aqueous solution of at least one type of niobium salt selected from the group consisting of niobium chloride, niobium oxychloride, niobium fluoride, and niobium bromide so that the sintered substrate having the nickel hydroxide filled is impregnated with the above-mentioned niobium salt, and finally immersing the sintered substrate impregnated with the niobium salt into an alkaline aqueous solution including sodium hydroxide so that niobium chloride impregnated in the sintered substrate deposits on the surface of the nickel hydroxide particles as the niobic acid.

The amount of the niobic acid to be adhered to the surface of the nickel hydroxide particles is adjusted by changing number of times of the above-mentioned operation for depositing niobic acid on the surface of the nickel hydroxide particles, or by changing time for which the sintered substrate having the nickel hydroxide filled is immersed in the above-mentioned aqueous solution of the niobium salt.

In addition, in the nickel electrode for an alkaline storage battery according to the present invention, at least one type of element selected from the group consisting of cobalt, zinc, cadmium, manganese, and aluminum is preferably incorporated into the above-mentioned nickel hydroxide particles. Because the oxygen overvoltage of the positive electrode is further increased for the effect of the incorporated elements, thus, when the alkaline storage battery is charged under high temperature conditions, the oxygen evolution reaction in the positive electrode is further prevented from occurring, and the high discharge capacity is attained. Especially when at least one type of element selected from cobalt and zinc is incorporated, higher discharge capacity is attained.

In incorporating the above-mentioned elements into the nickel hydroxide particles, when the amount of the elements is too small, the oxygen overvoltage of the positive electrode is not increased sufficiently, thus the discharge capacity after the charge under high temperature conditions is not so increased as mentioned above. On the other hand, when an amount of the elements is too large, the amount of the nickel hydroxide which is the active material is decreased, thus the sufficient discharge capacity is not attained. Therefore, the ratio of the elements to be incorporated into the nickel hydroxide particles based on the nickel hydroxide is preferably set in the range of 0.5 to 10 wt %.

In the nickel electrode for an alkaline storage battery according to the present invention, the hydroxide of at least one type of element selected from the group consisting of calcium, cobalt, yttrium, and ytterbium in addition to the niobic acid are preferably adhered to the surface of the nickel hydroxide particles. Because the oxygen overvoltage of the positive electrode is further increased for the effect of the hydroxide adhered to the surface of nickel hydroxide particles, thus, when the alkaline storage battery is charged under high temperature conditions, the oxygen evolution reaction in the positive electrode is further prevented from occurring and hence the high discharge capacity is attained. Especially when the hydroxide of at least one type of element selected from cobalt and yttrium is adhered, higher discharge capacity is attained.

In adhering the hydroxide of above-mentioned elements to the surface of the nickel hydroxide particles, when the amount of the hydroxide is too small, the oxygen overvoltage of the positive electrode is not increased sufficiently, thus the discharge capacity after the charge under high temperature conditions is not so increased as mentioned above. On the other hand, when the amount of the hydroxide is too large, electron conductivity of the positive electrode is decreased, thus the sufficient discharge capacity is not attained. Therefore, the ratio of the elements in the abovementioned hydroxide to be adhered to the surface of the nickel hydroxide particles based on the nickel hydroxide is preferably set in the range of 0.5 to 5 wt %.

Various ways can be employed to adhere the hydroxide of above-mentioned elements in addition to niobic acid to the surface of the nickel hydroxide particles. Examples of such ways include adhering niobic acid and the hydroxide of each of the above-mentioned elements respectively, and adhering a mixture of niobic acid and the hydroxide of each of the above-mentioned elements.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

Figure 1:
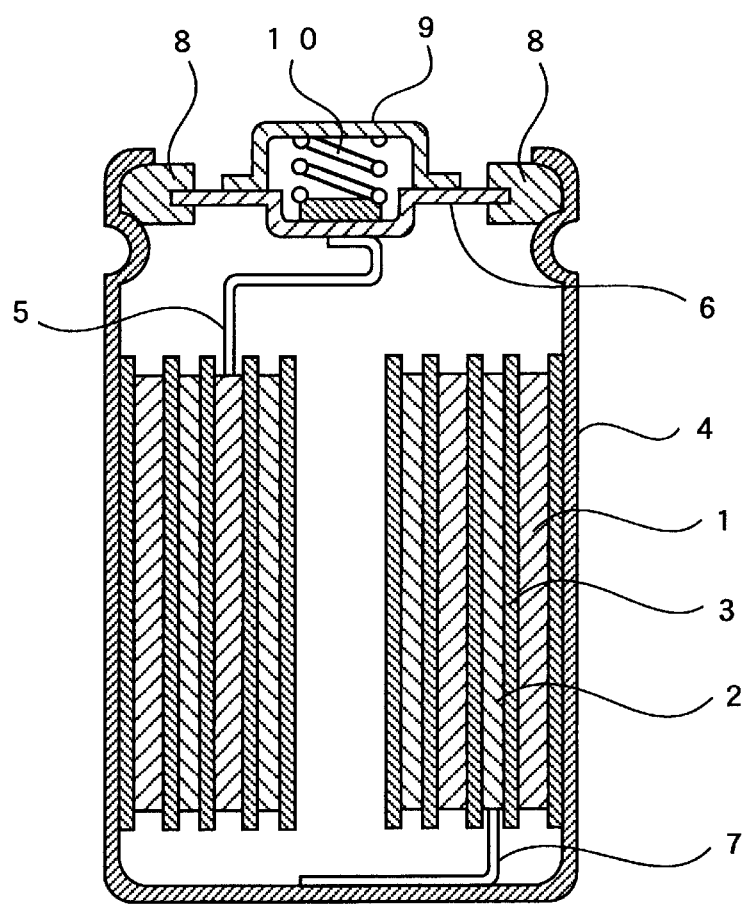
FIG. 1 is a schematic sectional view of each of alkaline storage batteries fabricated in examples and comparative examples of the invention.

The following examples specifically illustrate a nickel electrode for an alkaline storage battery and an alkaline storage battery employing as its positive electrode the nickel electrode for an alkaline storage battery. Further, comparative examples will be taken to make it clear that in each of the alkaline storage batteries according to the examples, a high discharge capacity is attained even in a case in which the alkaline storage battery is charged under high temperature conditions. It should be appreciated that the nickel electrode for an alkaline storage battery and the alkaline storage battery according to the present invention are not particularly limited to those in the following examples, and various changes and modifications may be made in the invention without departing from the spirit and scope thereof.

EXAMPLE A1

In an alkaline storage battery according to the example A1, a nickel electrode for an alkaline storage battery was fabricated through the following three steps.

Step 1 (Fabrication of Sintered Substrate)

Carbonyl nickel powder, carboxymethyl cellulose as a binding agent and water were mixed to prepare a slurry. The slurry thus prepared was applied to a punching metal having thickness of 50 $\mu$m, was dried, was burned for 20 minutes at a temperature of 900° C. in a hydrogen atmosphere to fabricate a sintered substrate having a porosity of about 85%, an average pore diameter of 10 $\mu$m, and thickness of 0.65 mm.

Step 2 (Filling Nickel Hydroxide into Pore of Sintered Substrate)

The above-mentioned sintered substrate was immersed in a nickel nitrate $Ni(NO_3)_2$ aqueous solution in a specific gravity of 1.5, was then immersed in 25 wt % of a sodium hydroxide aqueous solution. The operation was repeated for six times to fill nickel hydroxide particles into pore of the sintered substrate.

Step 3 (Addition of Niobic Acid to Surface of Nickel Hydroxide Particles)

The operation in which the sintered substrate thus having the nickel hydroxide particles filled into the pore was immersed in a niobium chloride $NbCl_5$ aqueous solution in a concentration of 0.1 mol/l for 30 minutes, was dried at a temperature of 60° C. for 30 minutes, was immersed in 30 wt % of a sodium hydroxide aqueous solution for 30 minutes, and was dried at a temperature of 60° C. for 30 minutes was carried out one time to form the nickel electrode for an alkaline storage battery in which niobic acid was adhered to the surface of the nickel hydroxide particles.

In the nickel electrode for an alkaline storage battery thus formed, the weight ratio of niobium Nb in the niobic acid based on nickel hydroxide found by ICP (Inductively Coupled Plasma Emission Spectrometry) was 0.2 wt %.

The nickel electrode for an alkaline storage battery thus formed was employed as the positive electrode while a paste type cadmium electrode which has been conventionally employed as a negative electrode was employed as the negative electrode. Polyamid non-woven fabric was used as a separator, and 30 wt % of a potassium hydroxide aqueous solution was used as an alkaline electrolyte solution.

Thus an alkaline storage battery of AA size having a capacity of 1000 mAh according to the example A1 as shown in FIG. 1 was fabricated.

In the alkaline storage battery, a separator 3 was interposed between a positive electrode 1 and a negative electrode 2, was wound up in a spiral shape, and was contained in a battery can 4. Thereafter, the alkaline electrolyte solution was poured into the battery can 4, to seal the battery can 4. The positive electrode 1 was connected to a positive electrode cover 6 through a positive electrode lead 5, and the negative electrode 2 was connected to the battery can 4 through a negative electrode lead 7. The battery can 4 and the positive electrode cover 6 were electrically deposited by an insulating packing 8.

A coil spring 10 was provided between the positive electrode cover 6 and a positive electrode external terminal 9. When the internal pressure of the battery was abnormally raised, the coil spring 10 was compressed so that gas inside the battery was released into the air.

Comparative Example 1

In the comparative example 1, in fabricating the nickel electrode for an alkaline storage battery, step 1 and step 2 of the fabrication of the nickel electrode for an alkaline storage battery according to the example A1 were carried out while step 3 was not so that the nickel electrode for an alkaline storage battery in which the nickel hydroxide particles on which niobic acid was not adhered were filled into the pore of the sintered substrate was fabricated.

Except that the nickel electrode for an alkaline storage battery thus fabricated was employed as the positive electrode, the same procedure as that in the example A1 was taken to fabricate an alkaline storage battery of AA size having a capacity of about 1000 mAh according to the comparative example 1.

Subsequently, each of the alkaline storage batteries of the example A1 and comparative example 1 was respectively charged at a charging current of 100 mA for 16 hours under a temperature condition of 25° C., then was discharged to 1.0 V at a discharging current of 1000 mA. Charge/discharge was regarded as one cycle. Five cycles of the charge/discharge were performed to find a discharge capacity Q5 at the fifth cycle of each of the alkaline storage batteries of the example A1 and comparative example 1.

The discharge capacity Q5 at the fifth cycle of the alkaline storage battery of the example A1 was set to 100, to find a relative index of the discharge capacity Q5, which was regarded as a capacity index, of the alkaline storage battery of the comparative example 1. The results were shown in the following Table 1.

Further, each of the above-mentioned alkaline storage batteries of the example A1 and comparative example 1 to which five cycles of the charge/discharge were carried out was further charged at the charging current of 100 mA for 16 hours under a high temperature condition of 60° C., then was discharged to 1.0 V at the discharging current of 1000 mA under a temperature condition of 25° C. to find the discharge capacity Q6 at the sixth cycle.

A ratio R (%) of the discharge capacity Q6 at the sixth cycle based on the discharge capacity Q5 at the fifth cycle of each of the alkaline storage batteries of the example A1 and comparative example 1 was calculated by a formula R (%)=(Q6/Q5)×100. The results were shown in the following Table 1. When the value of the ratio R is large, a decline in the discharge capacity in a case in which the battery is charged under high temperature conditions is small.

TABLE 1

| | capacity index | R (%) |
|---|---|---|
| example A1 | 100 | 86 |
| comparative example 1 | 98 | 40 |

As apparent from the results, the alkaline storage battery of the example A1 employing as its positive electrode the nickel electrode for an alkaline storage battery in which the niobic acid was adhered to the surface of the nickel hydroxide particles presented a smaller decline in the discharge capacity in a case in which the battery was charged under high temperature conditions compared with the alkaline storage battery of the comparative example 1 employing as its positive electrode the nickel electrode for an alkaline storage battery in which the niobic acid was not adhered to the surface of the nickel hydroxide particles.

EXAMPLES A2 to A7

In the examples A2 to A7, in fabricating the nickel electrode for an alkaline storage battery, step 1 and step 2 of the fabrication of the nickel electrode for an alkaline storage battery according to the example A1 were respectively carried out to fill the nickel hydroxide particles into the pore of the sintered substrate.

Then in the step 3 of the fabrication of the nickel electrode for an alkaline storage battery according to the example A1, in adhering the niobic acid to the surface of the nickel hydroxide particles filled into the pore of the sintered substrate, the conditions were changed.

In the examples A2 and A3, the time for which the sintered substrate having nickel hydroxide particles filled into the pore was immersed in the niobium chloride aqueous solution in the concentration of 0.1 mol/l was changed respectively to 5 minutes in the example A2 and 10 minutes in the example A3 as shown in the following Table 2. Except for the above, the same procedure as that in the example A1 was taken to fabricate the nickel electrodes for alkaline storage batteries in which the niobic acid was adhered to the surface of the nickel hydroxide particles.

In the examples A4 to A7, the number of times of the operation in which the sintered substrate having the nickel hydroxide particles filled into the pore was immersed in the niobium chloride aqueous solution in the concentration of 0.1 mol/l for 30 minutes, was dried at the temperature of 60° C. for 30 minutes, was immersed in the sodium hydroxide aqueous solution of 30 wt % for 30 minutes, and was dried at the temperature of 60° C. for 30 minutes was changed respectively to 3 times in the example A4, 5 times in the example A5, 8 times in the example A6, and 10 times in the example A7 as shown in the following Table 2. Except for the above, the same procedure as that in the example A1 was taken to fabricate the nickel electrodes for alkaline storage batteries in which the niobic acid was adhered to the surface of the nickel hydroxide particles.

In each of the nickel electrodes for alkaline storage batteries thus fabricated, weight ratio of niobium Nb in the niobic acid based on the nickel hydroxide found by ICP (Inductively Coupled Plasma Emission Spectrometry) was respectively 0.01 wt % in the example A2, 0.05 wt % in the example A3, 0.6 wt % in the example A4, 1 wt % in the example A5, 3 wt % in the example A6, and 4 wt % in the example A7 as shown in the following Table 2.

Except that each of the nickel electrodes for alkaline storage batteries thus fabricated was employed as the positive electrode, the same procedure as that in the example A1 was taken to fabricate each of the alkaline storage batteries of AA size having the capacity of about 1000 mAh in the examples A2 to A7.

Subsequently, the discharge capacity Q5 at the fifth cycle of each of the alkaline storage batteries of the examples A2 to A7 was found in the same manner as the above-mentioned example A1. The discharge capacity Q5 at the fifth cycle of the alkaline storage battery of the example A1 was set to 100, to find the relative index of the discharge capacity Q5, which was regarded as the capacity index, of each of the alkaline storage batteries of the examples A2 to A7. The results were shown in the Table 2.

Further, each of the above-mentioned alkaline storage batteries of the examples A2 to A7 to which five cycles of the charge/discharge were carried out was further charged at the charging current of 100 mA for 16 hours under the high temperature condition of 60° C., then was discharged to 1.0 V at the discharging current of 1000 mA under a temperature condition of 25° C. to find the discharge capacity Q6 at the sixth cycle. The ratio R (%) of the discharge capacity Q6 at the sixth cycle based on the discharge capacity Q5 at the fifth cycle was calculated. The results were shown in the following Table 2.

TABLE 2

|  | operation of step 3 | | | | |
| --- | --- | --- | --- | --- | --- |
|  | immersion time per operation (minute) | number of time of operation (time) | ratio of Nb (wt %) | capacity index | R (%) |
| example A2 | 5 | 1 | 0.01 | 99 | 72 |
| example A3 | 10 | 1 | 0.05 | 100 | 84 |
| example A1 | 30 | 1 | 0.2 | 100 | 86 |
| example A4 | 30 | 3 | 0.6 | 100 | 85 |
| example A5 | 30 | 5 | 1 | 100 | 85 |
| example A6 | 30 | 8 | 3 | 98 | 84 |
| example A7 | 30 | 10 | 4 | 93 | 73 |

As apparent from the results, each of the alkaline storage batteries of the examples A2 to A7 employing as the positive electrode the nickel electrode for an alkaline storage battery in which niobic acid was adhered to the surface of the nickel hydroxide particles presented the smaller decline in the discharge capacity in the case in which each of the batteries was charged under the high temperature conditions as the case of the alkaline storage battery of the example A1 compared with the alkaline storage battery of the comparative example 1 employing as its positive electrode the nickel electrode for an alkaline storage battery in which niobic acid was not adhered to the surface of the nickel hydroxide particles. Especially, the alkaline storage batteries of the examples A1 and A3 to A6 in which the weight ratio of the niobium Nb in the niobic acid based on the nickel hydroxide was in the range of 0.05 to 3 wt % presented even smaller decline in the discharge capacity after the charge under the high temperature conditions.

EXAMPLES B1 to B6

In the examples B1 to B6, in fabricating the nickel electrode for an alkaline storage battery, in filling the nickel hydroxide particles in the step 2 into the pore of the sintered substrate fabricated in the step 1 of the fabrication of the nickel electrode for an alkaline storage battery of the example A1, at least one type of element selected from the group consisting of cobalt Co, zinc Zn, cadmium Cd, manganese Mn, and aluminum Al was incorporated into the nickel hydroxide particles.

In the examples B1 to B6, in stead of the nickel nitrate aqueous solution in the specific gravity of 1.5 in which the sintered substrate was immersed, the aqueous solution in the specific gravity of 1.5 in which nickel nitrate and cobalt nitrate were in the weight ratio of 12.7:1 in the example B1, the aqueous solution in the specific gravity of 1.5 in which nickel nitrate and zinc nitrate were in the weight ratio of 13.6:1 in the example B2, the aqueous solution in the specific gravity of 1.5 in which nickel nitrate and cadmium nitrate were in the weight ratio of 18.8:1 in the example B3, the aqueous solution in the specific gravity of 1.5 in which nickel nitrate and manganese nitrate were in the weight ratio of 12.0:1 in the example B4, the aqueous solution in the specific gravity of 1.5 in which nickel nitrate and aluminum nitrate were in the weight ratio of 5:1 in the example B5, the aqueous solution in the specific gravity of 1.5 in which nickel nitrate, cobalt nitrate, and zinc nitrate were in the weight ratio of 32.0:1:2.5 in the example B6 was respectively used. Except for the above, the same procedure as that in the example A1 was taken to fabricate each of the nickel electrodes for alkaline storage batteries.

In each of the nickel electrodes for alkaline storage batteries thus formed, the weight ratio of each of the incorporated elements based on nickel hydroxide was found by ICP (Inductively Coupled Plasma Emission Spectrometry). The results were shown in the Table 3. The weight ratio of the niobium Nb in the niobic acid based on the nickel hydroxide was 0.2 wt % as the case of the above-mentioned example A1.

Except that each of the nickel electrodes for alkaline storage batteries was employed as the positive electrode, the same procedure as that in the example A1 was taken to fabricate each of the alkaline storage batteries of AA size having the capacity of about 1000 mAh in the examples B1 to B6.

Subsequently, the discharge capacity Q5 at the fifth cycle of each of the alkaline storage batteries of the examples B1 to B6 was found in the same manner as the above-mentioned example A1. The discharge capacity Q5 at the fifth cycle of the alkaline storage battery of the example A1 was set to 100 to find the relative index of the discharge capacity Q5, which was regarded as the capacity index, of each of the alkaline storage batteries of the examples B1 to B6. The results were shown in the Table 3.

Further, each of the above-mentioned alkaline storage batteries of the examples B1 to B6 to which five cycles of the charge/discharge were carried out was further charged at the charging current of 100 mA for 16 hours under the high temperature condition of 60° C., then was discharged to 1.0 V at the discharging current of 1000 mA under a temperature condition of 25° C. to find the discharge capacity Q6 at the sixth cycle. The ratio R (%) of the discharge capacity Q6 at the sixth cycle based on the discharge capacity Q5 at the fifth cycle was calculated. The results were shown in the following Table 3.

TABLE 3

|  | incorporated element | | capacity | |
| --- | --- | --- | --- | --- |
|  | type | ratio (wt %) | index | R (%) |
| example B1 | Co | 5 | 100 | 89 |
| example B2 | Zn | 5 | 100 | 89 |

TABLE 3-continued

| | incorporated element | | capacity | |
| --- | --- | --- | --- | --- |
| | type | ratio (wt %) | index | R (%) |
| example B3 | Cd | 5 | 100 | 88 |
| example B4 | Mn | 5 | 100 | 88 |
| example B5 | Al | 5 | 100 | 88 |
| example B6 | Co | 2 | 100 | 90 |
| | Zn | 5 | | |
| example A1 | — | — | 100 | 86 |

As apparent from the results, each of the alkaline storage batteries of the examples B1 to B6 employing as the positive electrode the nickel electrode for an alkaline storage battery in which at least one type of element selected from the group consisting of cobalt Co, zinc Zn, cadmium Cd, manganese Mn, and aluminum Al was incorporated into the nickel hydroxide particles and the niobic acid was adhered to the surface of the nickel hydroxide particles presented the smaller decline in the discharge capacity after the charge under the high temperature conditions compared with the alkaline storage battery of the example A1. Especially, the alkaline storage batteries of the examples B1, B2, and B6 in which at least one type of element selected from the group consisting of cobalt Co, and zinc Zn was incorporated into the nickel hydroxide particles presented even the smaller decline in the discharge capacity after the charge under high temperature conditions.

EXAMPLES C1 to C5

In the examples C1 to C5, in fabricating the nickel electrode for an alkaline storage battery, the same procedure as the above-mentioned steps 1 to 3 in the example A1 was taken to adhere the niobic acid to the surface of the nickel hydroxide particles filled into the pore of the sintered substrate. Subsequently, the hydroxide of at least one type of element selected from the group consisting of calcium Ca, cobalt Co, yttrium Y, and ytterbium Yb was adhered to the surface of the nickel hydroxide particles.

In adhering the hydroxide of above-mentioned elements to the surface of the nickel hydroxide particles, a calcium nitrate aqueous solution in the concentration of 0.12 mol/l in the example C1, a cobalt nitrate aqueous solution in the concentration of 0.08 mol/l in the example C2, an yttrium nitrate aqueous solution in the concentration of 0.05 mol/l in the example C3, an ytterbium nitrate aqueous solution in the concentration of 0.03 mol/l in the example C4, a mixed solution of the cobalt nitrate aqueous solution in the concentration of 0.08 mol/l and the yttrium nitrate aqueous solution in the concentration of 0.05 mol/l in the example C5 was respectively used.

The operation where the sintered substrates having the nickel hydroxide particles on which the niobic acid was adhered were respectively immersed in each of the above-mentioned aqueous solutions for 30 minutes, were dried at a temperature of 60° C. for 30 minutes, were immersed in the sodium hydroxide aqueous solution of 30 wt % for 30 minutes, and were dried at the temperature of 60° C. for 30 minutes was carried out four times to fabricate each of the nickel electrodes for alkaline storage batteries in which the hydroxide of the elements shown in the following Table 4 in addition to the niobic acid were adhered to the surface of the nickel hydroxide particles.

In each of the nickel electrodes for alkaline storage batteries thus fabricated, the weight ratio of each of the elements in each of the adhered hydroxides based on the nickel hydroxide was found by ICP (Inductively Coupled Plasma Emission Spectrometry), and the results were shown in the following Table 4. The weight ratio of the niobium Nb in the niobic acid based on the nickel hydroxide was 0.2 wt % as the case of above-mentioned example A1.

Except that each of the nickel electrodes for alkaline storage batteries thus formed was employed as the positive electrode, each of the alkaline storage batteries of AA size having a capacity of about 1000 mAh according to the examples C1 to C5 was fabricated in the same manner as the above-mentioned example A1.

Subsequently, the discharge capacity Q5 at the fifth cycle of each of the alkaline storage batteries of the examples C1 to C5 was found in the same manner as the above-mentioned example A1. The discharge capacity Q5 at the fifth cycle of the alkaline storage battery of the example A1 was set to 100 to find the relative index of the discharge capacity Q5, which was regarded as the capacity index, of each of the alkaline storage batteries of the examples C1 to C5. The results were shown in the Table 4.

Further, each of the above-mentioned alkaline storage batteries of the examples C1 to C5 to which five cycles of the charge/discharge were carried out was further charged at the charging current of 100 mA for 16 hours under the high temperature condition of 60° C., then was discharged to 1.0 V at the discharging current of 1000 mA under a temperature condition of 25° C. to find the discharge capacity Q6 at the sixth cycle. The ratio R (%) of the discharge capacity Q6 at the sixth cycle based on the discharge capacity Q5 at the fifth cycle was calculated. The results were shown in the following Table 4.

TABLE 4

| | each hydroxide except for niobic acid | | | |
| --- | --- | --- | --- | --- |
| | type of element | ratio (wt %) | capacity index | R (%) |
| example C1 | Ca | 1 | 100 | 88 |
| example C2 | Co | 1 | 100 | 89 |
| example C3 | Y | 1 | 100 | 89 |
| example C4 | Yb | 1 | 100 | 88 |
| example C5 | Co | 0.5 | 100 | 90 |
| | Y | 0.5 | | |
| example A1 | — | — | 100 | 86 |

As apparent from the results, each of the alkaline storage batteries of the examples C1 to C5 employing as the positive electrode the nickel electrode for an alkaline storage battery in which the hydroxide of at least one type of element selected from the group consisting of calcium Ca, cobalt Co, yttrium Y, and ytterbium Yb in addition to the niobic acid were adhered to the surface of the nickel hydroxide particles presented the smaller decline in the discharge capacity after the charge under the high temperature conditions compared with the alkaline storage battery of the example A1. Especially, the alkaline storage batteries of the examples C2, C3, and C5 in which the hydroxide of at least one type of element selected from the group consisting of cobalt Co, and yttrium Y in addition to the niobic acid were adhered presented even the smaller decline in the discharge capacity after the charge under high temperature conditions.

Although the present invention has been fully described by way of examples, it is to be noted that various changes and modification will be apparent to those skilled in the art.

Therefore, unless otherwise such changes and modifications depart from the scope of the present invention, they should be construed as being included therein.

What is claimed is:

1. A method of fabricating a nickel electrode for an alkaline storage battery comprising steps of:

filling nickel hydroxide particles into pores of a porous sintered substrate, impregnating the sintered substrate having the nickel hydroxide filled with niobium salt, and depositing said niobium salt on the surface of the nickel hydroxide particles filled into the sintered substrate as niobic acid;

said active material is formed by adhering niobic acid to a surface of nickel hydroxide particles.

2. The method of fabricating the nickel electrode for an alkaline storage battery according to claim 1, wherein said niobium salt is at least one type selected from a group consisting of niobium chloride, niobium oxychloride, niobium fluoride, and niobium bromide.

3. An alkaline storage battery provided with a positive electrode employing a nickel electrode for an alkaline storage battery, a negative electrode, and an alkaline electrolyte solution, wherein said nickel electrode for an alkaline storage battery is formed by the method according to claim 1.

4. The alkaline storage battery according to claim 3, wherein a weight ratio of niobium in niobic acid based on nickel hydroxide in the nickel electrode for an alkaline storage battery is in a range of 0.05 to 3 wt %, in said nickel electrode for an alkaline storage battery.

5. The nickel electrode for an alkaline storage battery according to claim 3, wherein at least one element selected from a group consisting of cobalt, zinc, cadium, manganese, and aluminum is incorporated into said nickel hydroxide particles, in said nickel electrode for an alkaline storage battery.

6. The nickel electrode for an alkaline storage battery according to claim 5, wherein at least one element selected from the cobalt and zinc is incorporated into said nickel hydroxide particles, in said nickel electrode for an alkaline storage battery.

7. The nickel electrode for an alkaline storage battery according to claim 3, wherein a hydroxide of at least one element selected from the group consisting of calcium, cobalt, yttrium, and ytterbium in addition to said niobic acid are adhered to the surface of said nickel hydroxide particles, in said nickel electrode for an alkaline storage battery.

8. The nickel electrode for an alkaline storage battery according to claim 7, wherein the hyrdroxide of at least one element selected from cobalt and yttrium in addition to said niobic acid are adhered to the surface of said nickel hydroxide particles, in said nickel electrode for an alkaline storage battery.

* * * * *